US011120368B2

(12) United States Patent
Varadarajan et al.

(10) Patent No.: US 11,120,368 B2
(45) Date of Patent: Sep. 14, 2021

(54) SCALABLE AND EFFICIENT DISTRIBUTED AUTO-TUNING OF MACHINE LEARNING AND DEEP LEARNING MODELS

(71) Applicant: Oracle International Corporation, Redwood Shores, CA (US)

(72) Inventors: Venkatanathan Varadarajan, Bellevue, WA (US); Sam Idicula, Santa Clara, CA (US); Sandeep Agrawal, San Jose, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 576 days.

(21) Appl. No.: 16/137,719

(22) Filed: Sep. 21, 2018

(65) Prior Publication Data

US 2019/0095819 A1 Mar. 28, 2019

Related U.S. Application Data

(60) Provisional application No. 62/563,893, filed on Sep. 27, 2017.

(51) Int. Cl.
*G06F 3/00* (2006.01)
*G06N 20/00* (2019.01)
(Continued)

(52) U.S. Cl.
CPC .......... *G06N 20/00* (2019.01); *G06F 9/4881* (2013.01); *G06N 3/0481* (2013.01); *G06N 3/082* (2013.01);
(Continued)

(58) Field of Classification Search
CPC .................. G06N 20/00; G06F 9/54
(Continued)

(56) References Cited

U.S. PATENT DOCUMENTS 10,832,087 B1  11/2020  Wang et al.
2002/0169735 A1  11/2002  Kil et al.
(Continued)

FOREIGN PATENT DOCUMENTS

EP          3 101 599 A2      12/2016
WO     WO 2008/133509 A1     11/2008

OTHER PUBLICATIONS

Tianwei Zhang, Privacy-preserving Machine Learning through Data Obfuscation (Year: 2018).*

(Continued)

*Primary Examiner* — Lechi Truong
(74) *Attorney, Agent, or Firm* — Hickman Becker Bingham Ledesma LLP

(57) ABSTRACT

Herein are techniques for automatic tuning of hyperparameters of machine learning algorithms. System throughput is maximized by horizontally scaling and asynchronously dispatching the configuration, training, and testing of an algorithm. In an embodiment, a computer stores a best cost achieved by executing a target model based on best values of the target algorithm's hyperparameters. The best values and their cost are updated by epochs that asynchronously execute. Each epoch has asynchronous costing tasks that explore a distinct hyperparameter. Each costing task has a sample of exploratory values that differs from the best values along the distinct hyperparameter. The asynchronous costing tasks of a same epoch have different values for the distinct hyperparameter, which accomplishes an exploration. In an embodiment, an excessive update of best values or best cost creates a major epoch for exploration in a subspace that is more or less unrelated to other epochs, thereby avoiding local optima.

20 Claims, 7 Drawing Sheets

(51) Int. Cl.
  G06F 9/48    (2006.01)
  G06N 3/08    (2006.01)
  G06N 3/04    (2006.01)
  G06N 5/00    (2006.01)
  G06N 7/00    (2006.01)
  G06N 20/20   (2019.01)
  G06N 20/10   (2019.01)
  G06N 3/12    (2006.01)

(52) U.S. Cl.
  CPC ............ *G06N 5/003* (2013.01); *G06N 7/005* (2013.01); *G06N 20/20* (2019.01); *G06N 3/126* (2013.01); *G06N 20/10* (2019.01)

(58) Field of Classification Search
  USPC ........................................................ 719/310
  See application file for complete search history.

(56) References Cited

U.S. PATENT DOCUMENTS

| | | |
|---|---|---|
| 2014/0344193 A1 | 11/2014 | Bilenko et al. |
| 2017/0169360 A1 | 6/2017 | Veeramachaneni et al. |
| 2018/0022539 A1 | 1/2018 | Vedani |
| 2018/0046926 A1 | 2/2018 | Achin |
| 2018/0225391 A1 | 8/2018 | Sali et al. |
| 2019/0087529 A1 | 3/2019 | Steingrimsson |
| 2019/0095756 A1 | 3/2019 | Agrawal |
| 2019/0095785 A1 | 3/2019 | Sarkar et al. |
| 2019/0095818 A1 | 3/2019 | Varadarajan |
| 2019/0197357 A1 | 6/2019 | Anderson |
| 2019/0244139 A1 | 8/2019 | Varadarajan |
| 2019/0377610 A1* | 12/2019 | Gupta ................... G06F 9/5038 |
| 2019/0392255 A1 | 12/2019 | Franklin |
| 2020/0076841 A1 | 3/2020 | Hajimirsadeghi |
| 2020/0082013 A1 | 3/2020 | Triplet et al. |
| 2020/0089917 A1* | 3/2020 | Skourtis ................. H04L 9/008 |
| 2020/0327448 A1 | 10/2020 | Yakovlev |
| 2020/0334569 A1 | 10/2020 | Moghadam |
| 2020/0342265 A1 | 10/2020 | Cai |
| 2020/0364599 A1 | 11/2020 | Ma |

OTHER PUBLICATIONS

Reif et al., "Prediction of Classifier Training Time including Parameter Optimization", dated Oct. 2011, 13 pages.
Peskova et al., "Hybrid Multi-Agent System for Metalearning in Data Mining", dated Sep. 19, 2014, 2 pages.
Lindne et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Furnkranz et al., "An Evaluation of Landmarking Variants", dated 2001, 12 pages.
Filchenkjov et al., "Datasets Meta-Feature Description for Recommending Feature Selection Algorithm", dated Nov. 2015, 9 pages.
Feurer et al., "Initializing Bayesian Hyperparameter Optimization via Meta-Learning", Proceedings of the Twenty-Ninth AAAI Conference on Artificial Intelligence dated 2015, 8 pages.
Castiello et al., "Meta-data: Characterization of Input Features for Meta-learning", Springer-Verlag Berlin Heidelberg dated 2005, 13 pages.
Brazdil, Pavel, "Metalearning and Algorithm Selection: Progress, State of the Art and Introduction of the 2018 Special Issue", dated Dec. 2017, 23 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.

Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Varadarajan, U.S. Appl. No. 15/914,883, filed Mar. 7, 2018, Office Action, dated Dec. 1, 2020.
Xin, Guo "A New Approach Towards the Combined Algorithm Selection and Hyper-parameter Optimization Problem", dated Jan. 28, 2019, 57 pages.
Trond et al., "Impact of Training Dataset Size on Neural Answer Selection Models" ROBOCUP 2008, dated Apr. 7, 2019, pp. 828-835.
Petrak et al., "On the Use of Fast Subsampling Estimates for Algotithm Recommendation", dated Nov. 1, 2020, 10 pages.
Huang et al., "ABC: Efficient Selection of Machine Learning Configuration on Large Dataset", ARXIV.org, Cornell University Library, dated Nov. 8, 2018, 12 pages.
G.H John et al., "Static Versus Dynamic Sampling for Data Mining" KDD-96 Proceedings, dated Dec. 31, 1996, 4 pages.
Francois Portet et al., "Reduction of Lage Traning Set by Guided Progressive Sampling: Application to Neonatal Intensive Care Data", dated Jan. 1, 2001, 2 pages.
Foster Provost et al., "Efficient Progressive Sampling", Proceedings/KDD-99, The fifth ACM Sigkdd International Conference on Knowledge Discovery and Data Mining, dated Aug. 1, 1999, pp. 23-32.
Figueroa et al., "Predicting Sample Size Required for Classification Performace", BMC Medical Informatics and Decision Making, Biomed Central, vol. 12 No. 1, dated Feb. 15, 2012, 10 pages.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Nelder et al., "A Simplex Method for Function Minimization", The Computer Journal, vol. 7, dated Apr. 1, 1964, pp. 308-313.
Mendes-Moreira et al., "Ensemble Approaches for Regression", ACM Computing Surveys, ACM, New York, NY vol. 45, No. 1, dated Dec. 7, 2012, pp. 1-40.
J.D Wichard, "Model Selection in an Ensemble Framework", The 2013 International Joint Conference on Neural Networks, dated Jan. 1, 2006, pp. 2187-2192.
Gonnet et al., Automatic Problem-Specific Hyperparameter Optimization and Model Selection for Supervised Machine Learning, Technical Report, dated Jan. 1, 2015, 54 pages.
Chen Chi-Ou et al., "Machine Learning-Based Configuration Parameter Tuning on Hadoop System", dated Jun. 27, 2015, IEEE, pp. 386-392.
Caruana et al., "Ensemble Selection From Libraries of Models", Proceedings, Twenty-First International Conference on Machine Learning: dated Jul. 2004, 8 pages.
Aldave et al., "Systematic Ensemble Learning fro Regression" dated Mar. 28, 2014, pp. 1-38.
Zhen Hua Liu et al. "JSON Data Management in RDBMS", Emerging Technologies and Applications in Data Processing and Management, dated May 13, 2019, pp. 20-45.
Knut Anders Hatlen, "Partial Update of JSON Values", MySQL Server Blog, dated Apr. 3, 2018, 6 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Ng, "Data preprocessing for machine learning: options and recommendations", dated Jun. 22, 2020, 12 pages.
Abe et al., "Developing an Integrated Time-Series Data Mining Environment for Medical Data Mining", Seventh IEEE International Conference on Data Mining—Workshops, dated 2007, 6 pages.

(56) References Cited

OTHER PUBLICATIONS

Ahmed et al., "An Empirical Comparison of Machine Learning Models for Time Series Forecasting", dated Sep. 15, 2010, 31 pages.
Amazon SageMaker, "DeepAR Forecasting Algorithm", https://docs.aws.amazon.com/sagemaker/latest/dg/deepar.html,last viewed on Jun. 29, 2020, 5 pages.
Artificial Intelligence Blog, "Announcing automated ML capability in Azure Machine Learning", dated Sep. 24, 2018, 8 pages.
Brownlee, Jason, "Time Series Forecasting as Supervised Learning", dated Aug. 21, 2019, 2 pages.
Camerra et al., "Beyond one billion time series: indexing and mining very large time series collections with iSAX2+", dated Feb. 16, 2013, 29 pages.
Faloutsos et al., "Fast Subsequence Matching in Time Series Databases", dated 1998, 11 pages.
"Machine Learning Approaches for Time Series Data" dated May 19, 2019, 25 pages.
Lin et al., "Experiencing SAX: a novel symbolic representation of time series", dated Apr. 3, 2007, 38 pages.
Wang et al., "Experimental comparison of representation methods and distance measures for time series data", dated Feb. 12, 2010, 35 pages.
Olson et al., "Evaluation of a Tree-based Pipeline Optimization Tool for Automating Data Science", dated Mar. 20, 2016, 8 pages.
Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
USPTO, "Public Views on Artificial Intelligence and Intellectual Property Policy", dated Oct. 2020, 50 pages.
Kraska, Tim, "Northstar: An Interactive Data Science System", Proceedings of the VLDB Endowment, vol. 11, No. 12 Copyright 2018 VLDB Endowment, 15 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Kiros et al., "Skip-Thought Vectors", dated 2015, 9 pages.
Hutter et al., "Sequential Model-Based Optimization for General Algorithm Configuration", dated 2011, 15 pages.
Hochreiter, Sepp, "Long Short Term Memory", Nural Computation, dated Nov. 15, 1997, 46 pages.
Hill et al., "Learning Distributed Representations of Sentences from Unlabelled Data", dated Feb. 10, 2016, 11 pages.
HaddadPajouh et al, "A Two-layer Dimension Reduction and Two-tier Classification Model for Anomaly-Based Intrusion Detection in IoT Backbone Networks", dated 2016, 12 pages.
Gonzalez et al., "Batch Bayesian Optimization via Local Penalization", Proceedings of the 19th International Conference on Artificial Intelligence and Statistics, dated 2016, 10 pages.
Ghosh et al., "Detecting Anomalous and Unknown Intrusions Against Programs", dated 1998, 9 pages.
Feurer et al., "Initializing Bayesian Hyperparameter Optimization via Meta-Learning", Proceedings of the Twenty-Ninth AAAI Conference on Artificial Intelligence, dated Jan. 2015, 8 pages.
Feurer et al., "Efficient and Robust Automated Machine Learning", dated 2015, 9 pages.
Andrychowicz et al., "Learning to learn by gradient descent by gradient descent", 30th Conference on Neural Information Processing Systems dated (NIPS 2016), Barcelona, Spain, 9 pages.
Doan et al., "Selecting Machine Learning Algorithms using Regression Models", →researchgate.net/publication/304298580, dated Nov. 2015, 8 pages.
Le et al., "Distributed Representations of Sentences and Documents", Proceedings of the 31 st International Conference on Machine Learning, Beijing, China, dated 2014, 9 pages.
Dai et al., "Semi-supervised Sequence Learning", dated 2015, 9 pages.
Conneau et al. "Supervised Learning of Universal Sentence Representations from Natural Language Inference Data", Dated Jul. 21, 2017, 12 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Bontemps et al., "Collective Anomaly Detection based on Long Short Term Memory Recurrent Neural Network", dated 2016, 12 pages.
Berlin et al., "Malicious Behavior Detection using Windows Audit Logs", dated Aug. 25, 2015, 10 pages.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
Bengio et al., "A Neural Probabilistic Language Model", Journal of Machine Learning Research 3, dated Feb. 2003, 19 pages.
Du et al. DeepLog: Anomaly Detection and Diagnosis from System Logs through Deep Learning, CCS'17, Oct. 30-Nov. 3, 2017, 14 pages.
Ruder, Sebastian, "An Overview of Gradient Descent Optimization Algorithms", dated Jun. 15, 2017, 14 pages.
Yousefi-Azar et al., "Autoencoder-based Feature Learning for Cyber Security Applications", dated 2017, 8 pages.
Weinberger et al., "Unsupervised learning of image manifolds by semidefinite programming", IEEE, dated Jun. 27, 2004, 10 pages.
Usama et al., "Unsupervised Machine Learning for Networking: Techniques, Applications and Research Challenges", dated Sep. 19, 2017, 37 pages.
Tuor et al., "Deep Learning for Unsupervised Insider Threat Detection in Structured Cybersecurity Data Streams", dated Dec. 15, 2017, 9 pages.
Sutskever et al., "Sequence to Sequence Learning with Neural Networks", dated 2014, 9 pages.
Snoek, "Practical Bayesian Optimization of Machine Learning Algorithms", dated 2012, 9 pages.
Snoek et al., "Scalable Bayesian Optimization Using Deep Neural Networks", dated 2014, 10 pages.
Snoek et al, "Input Warping for Bayesian Optimization of Non-Stationary Functions", Proceedings of the 31 st International Conference on Machine Learning, Beijing, China, 2014, 9 pages.
Simpson et al, "Automatic Algorithm Selection in Computational Software Using Machine Learning", dated 2016, 10 pages.
Shipmon et al., "Time Series Anomaly Detection", Detection of Anomalous Drops with Limited Features and Sparse Examples in Noisy Highly Periodic Data, dated 2017, 9 pages.
Kolosnjaji et al., "Deep Learning for Classification of Malware System Call Sequences", dated 2016, 12 pages.
Scikit Learn, "3.2 Tuning the hyper-parameters of an estimator", http://scikit-learn.org/stable/modules/grid_search.html, last viewed on Mar. 13, 2018, 5 pages.
Kuck et al, "Meta-learning with neural networks and landmarking for forecasting model selection an empirical evaluation of different feature sets applied to industry data", dated Jul. 24-29, 2016, 8pgs.

(56) References Cited

OTHER PUBLICATIONS

Pinter, Janos, "Calibrating Artificial Neural Networks by Global Optimization", Technical Report, Özyeğin University, Istanbul Submitted for publication: Jul. 2010, 17 pages.

Mnih et al., "A Scalable Hierarchical Distributed Language Model", dated 2009, 8 pages.

Mikolov et al., "Efficient Estimation of Word Representations in Vector Space", dated Sep. 7, 2013, 12 pages.

Mikolov et al., "Distributed Representations of Words and Phrases and their Compositionality", dated 2013, 9 pages.

Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.

Malhotra et al., "Long Short Term Memory Networks for Anomaly Detection in Time Series", ESANN dated Apr. 22, 2015 proceedings, European Symposium on Artificial Neural Networks, 6 pages.

Maclaurin et al., "Gradient-based Hyperparameter Optimization through Reversible Learning", Proceedings of the 32nd International Conference on Machine Learning, Lille, France, dated 2015, 10 pages.

Luo et al., "A Revisit of Sparse Coding Based Anomaly Detection in Stacked RNN Framework", dated Oct. 2017, 9 pages.

Liu et al., "Detecting and Preventing Cyber Insider Threats: A Survey", IEEE Communications Survey & Tutorials, dated 2018, 21 pages.

YuanZhong, Zhu, "Intrusion Detection Method based on Improved BP Neural Network Research", International Journal of Security and Its Applications vol. 10, No. 5 (2016) pp. 193-202.

Seleznyov et al., "Anomaly Intrusion Detection Systems: Handling Temporal Relations between Events", dated 1999, 12 pages.

Hsu et al., "A Practical Guide to Support Vector Classification", May 19, 2016, National Taiwan University, 2016, pp. 1-16.

Brochu et al., "A Tutorial on Bayesian Optimization of Expensive Cost Functions, with Application to Active User Modeling and Hierarchical Reinforcement Learning", pp. 1-49.

\* cited by examiner

SCALABLE AND EFFICIENT DISTRIBUTED AUTO-TUNING OF MACHINE LEARNING AND DEEP LEARNING MODELS

RELATED APPLICATIONS; BENEFIT CLAIM

This application claims the benefit of Provisional Appln. 62/563,893, filed Sep. 27, 2017, titled "SCALABLE AND EFFICIENT DISTRIBUTED AUTO-TUNING OF MACHINE LEARNING AND DEEP LEARNING MODELS," the entire contents of which is hereby incorporated by reference as if fully set forth herein, under 35 U.S.C. § 119(e). The following related documents are incorporated herein by reference:
- U.S. application Ser. No. 15/885,515, filed Jan. 31, 2018, titled "GRADIENT-BASED AUTO-TUNING FOR MACHINE LEARNING AND DEEP LEARNING MODELS"; and
- "EXACT CALCULATION OF THE HESSIAN MATRIX FOR THE MULTI-LAYER PERCEPTRON," by Christopher M. Bishop, published in Neural Computation 4 No. 4 (1992) pages 494-501.

FIELD OF THE INVENTION

The present invention relates to auto-tuning of hyperparameters of machine learning (ML) algorithms. Herein are techniques for maximizing system throughput by horizontally scaling of auto-tuning, asynchronously propagating a best tuning so far, and canceling unpromising work in progress during tuning.

BACKGROUND

Application of machine learning (ML) is becoming ubiquitous. However, data science expertise will remain scarce. Dependence on data scientists for tuning every machine learning model will not be sustainable or scalable.

Automatically tuning a deep learning (DL) model or other ML model involves following steps:
1. Pick good hyperparameter combinations as model configurations. An instance of an ML model is configured before training. Once training begins, a model's hyperparameters do not change;
2. Configure, train, and test each model, which is computationally/temporally expensive; and
3. Repeat until a desired model performance is achieved.

This process of automatically tuning ML/DL models is challenging for the following reasons:
- Large number of hyperparameters: Especially Deep Neural Network models (e.g. Multi-Layer Perceptron or MLP, Convolutional Neural Networks or CNN) may have large number of parameters like number of layers, number of neurons, dropout in each layer, etc. Hyperparameters are akin to nobs and switches that may be adjusted/tuned to change the way the target ML model operates. The goal is to quickly find an optimal tuning, i.e. an optimal set of values, with one value per hyperparameter, that causes the target model to behave optimally. Each hyperparameter has a predefined range of reasonable values of a given type such as a real or integer number. Discrete types such as Boolean or enumeration of literals can be encoded as an integer. Thus, each hyperparameter is a dimension or axis in a multidimensional/combinatoric solution space of possible hyperparameter value sets (unique solution points). Each solution point has one value for each hyperparameter. A less tunable target model (e.g. logistic regression or support vector machine, SVM) has few hyperparameters (e.g. 1-2). More tunable target models (e.g. neural network) have more hyperparameters (e.g. 5-10);
- Wide-range of possible values: These parameters vary over a wide-range of values and the choice of these values have a significant impact on the model performance (typically measured in prediction accuracy). Unfortunately, choices of these parameters are often ad-hoc and highly depend on the data scientist's experience; and
- Training is time consuming: Training time of a single model is often expensive and tuning requires re-training models and evaluating them several times per tuning session.

Hence the search space is often large, and sophisticated DL models often have large training times, so any autotuning approach has enough computational capacity to scale across a large distributed cluster of machines. Unfortunately, there are several key challenges that inherently limit the scaling of ML autotuning algorithms:
- Need for Synchronization: The parallel searches that happen independent of each other should be frequently synchronized to share results that are essential for a global optimization model. For example, many Bayesian optimization approaches inherently follow a Sequential Model-Based Optimization (SMBO), where each step in the search space is taken after the previous step is completed. An alternative to this approach exploits batch parallelism where each step involves parallel evaluation of several parameter combinations. It is essential that all the results from a batch are pooled together to make efficient progress in quickly converging at the model with highest performance. This frequent synchronization at the end of every batch is expensive and not scalable.
- Variation in Model Evaluation Cost: Model training time (and hence evaluation time) is highly dependent on the choice of the hyper parameter. For example the training time for a fully connected neural network classifier directly increases with an increase in number of neurons or layers. Hence, in conjunction with the need for synchronization, a single batch may have an evaluation that takes significantly longer than others, which reduces any benefit from parallelization over a large cluster. Thus, straggling units of work reduce system throughput.
- Generalize to Large Class of Models: Apart from variations within the model, there are more variations in runtime for different models. This makes the problem more challenging when designing one scalable auto-tuning framework for varying model characteristics some of which may require scaling a single training session (e.g. DL model that has numerous parameters that may not fit in-memory of a single computer of a cluster).
- Large datasets: Conventional wisdom suggests that many challenging prediction tasks benefit from massive datasets to learn any complex pattern. This is particularly true for DL models. Because training time is directly proportional to the number of samples or rows (and sometimes number of features or columns) in the training dataset, scaling across a larger cluster is needed for autotuning to be practical.

Some techniques that attempt to parallelize Bayesian-based hyperparameter optimization techniques limit their parallelization efforts across multiple cores within a single computer of a cluster. They do not consider how important is horizontally scaling across a computer cluster. Another significant difference is that other techniques try to parallelize Bayesian optimization approaches which is inherently sequential. Published prior work does not discuss or enable asynchronous search, which is essential for distributed (e.g. elastic) scaling. Various techniques neither automatically tune an ML model nor search the model's range of hyperparameters. Techniques that incorporate randomness (e.g. to avoid local optima) do not guarantee of convergence.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
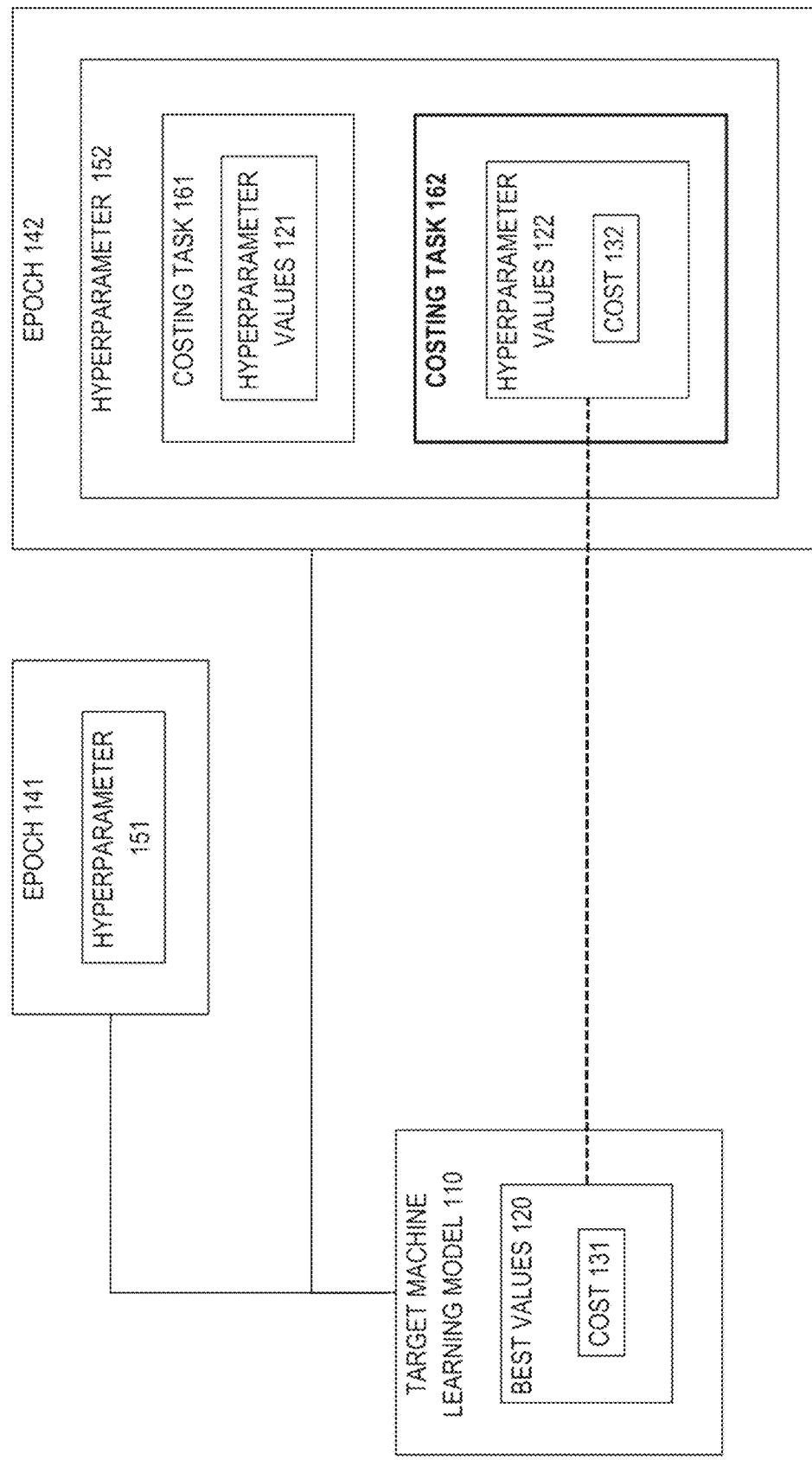
FIG. 1 is a block diagram that depicts an example computer that uses parallel asynchrony for exploring and costing a hyperparameter space of a machine learning (ML) model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a managed machine learning (ML) platform that, given a dataset, a ML model that has configuration hyperparameters, and a desired prediction task, can quickly produce a trained model with high accuracy to increase the productivity of a data scientist. With asynchronous parallelism, the platform is able to accelerate hyperparameter exploration. Accelerated exploration, for a same duration as without acceleration, yields better hyperparameter values, which are those that reduce subsequent training time and/or increase model accuracy.

In an embodiment, each hyperparameter dimension is asynchronously tuned without waiting for the completion of any other hyperparameters. Asynchrony is achieved by waiting only for the minimum number of evaluations that is essential to make meaningful progress in autotuning.

In an embodiment, stragglers during cost-based search space exploration are reduced by automatically learning the cost function from past evaluations on a current dataset. A non-linear function is used for each parameter to map each parameter value to a cost function and sample this function with increasing affinity towards less costly (e.g. optimal) points in the parameter search space. The cost model is dynamically updated when new results are explored, which facilitates automatically learning the cost function without user input.

In an embodiment, cost-aware distributed scheduling is used to avoid an imbalanced workload across a cluster of computers, which improves horizontal scalability. When there are more tasks than computers, batching tasks are assigned to independent executors such that the average cost of each batch is close to the global average cost of all pending tasks.

In an embodiment, inter-dependencies between hyperparameters dimensions and intra-hyperparameter parallel explorations are quickly detected. Any future exploration is updated to use newly learned best parameter configurations. Hierarchical organization of epochs (into major and minor epochs) balances between refining old results versus starting a new exploration because of significantly different findings. A good balance of epoch ages guarantees a balance between limiting resource usages versus fine-tuning accuracy. A user can control the age balance with a simple interface, a choice between getting fast reasonably good results versus getting more accurate results but waiting longer for those results.

In an embodiment, long running jobs that are stale or heuristically less valuable for the search space reduction are dynamically monitored and canceled. The organization of major and minor epochs are utilized to heuristically identify stale tasks that belong to older major epochs. Cancelation limits the number of outstanding tasks and effectively utilizes available distributed compute resources, thus improving system throughput.

In an embodiment, a computer stores a best cost achieved by executing a target model based on best values of the target model's hyperparameters. The best values and their cost are updated by epochs that asynchronously execute. Each epoch has asynchronous costing tasks that explore a distinct hyperparameter. Each costing task has a sample of exploratory values that differs from the best values along the distinct hyperparameter. The asynchronous costing tasks of a same epoch have different values for the distinct hyperparameter, which accomplishes an exploration. In an embodiment, an excessive update of best values or best cost creates a major epoch for exploration in a subspace that is more or less unrelated to other epochs, thereby avoiding local optima.

1.0 Example Computer

FIG. 1 is a block diagram that depicts an example computer 100, in an embodiment. Computer 100 uses parallel asynchrony for exploring and costing a multidimensional hyperparameter space (i.e. hyperspace) of a model for a machine learning (ML) model. Computer 100 may be one or more of a rack server such as a blade, a personal computer, a mainframe, or other computing device.

1.1 Machine Learning Algorithms

Computer 100 may repeatedly and concurrently train and test target model 110 for a ML algorithm that can be uniquely reconfigured for each training session. Thus, each training session may perform differently despite sharing a same training dataset. Computer 100 contains or accesses a specification (not shown) of target model 110 that may perform analysis such as classification, regression, clustering, or anomaly detection. For example, target model 110 may be a support vector machine (SVM), an artificial neural network (ANN), a decision tree, or a random forest.

In an embodiment, target model 110 is an ML model of a kind not mentioned above. Computer 100 may succeed with any kind of ML model. Computer 100 may be future proof, such that a yet to be invented kind of ML model is also supported by the techniques herein. Machine learning is discussed later herein in the Machine Learning Model section.

1.2 Hyperparameters

Configurable features of target model 110 are referred to as hyperparameters. For example target model 110 has hyperparameters 151-152, which may be peculiar to the particular machine learning algorithm. If target model 110 is a support vector machine, then hyperparameters 151-152 typically include C and gamma. If target model 110 is a neural network, then hyperparameters 151-152 may include features such as a count of layers and/or a count of neurons per layer.

1.3 Value Range

Each hyperparameter 151-152 has a data type that has its own natural range of values. For example, a count of neural layers may be an integer that ranges from three to ten. Depending on the hyperparameter, the range of possible values may be numeric, such as integer or real. Some value ranges may be categorical and limited to discrete symbolic (i.e. non-numeric) values, such as labels or literals that may or may not have a relative ordering.

1.4 Hyperparameter Permutations

The target model 110 may have many configuration alternatives based on combinations of values of hyperparameters 151-152. Each of hyperparameters 151-152 may logically be a separate axis/dimension in a multidimensional hyperspace (not shown). Each distinct configuration of target model 110 is represented by a distinct set of hyperparameter values, such as 120-122, that corresponds to a distinct point in that hyperspace. For example, separate training sessions for target model 110 may be separately configured with respective sets of hyperparameter values 120-122 to achieve separate performance results. Each set of hyperparameter values 120-122 has a value for each hyperparameter 151-152. Although sets of hyperparameter values 120-122 may have some values in common, each set of hyperparameter values 120-122 has a unique combination of values.

1.5 Configuration and Training

Computer 100 may use a set of hyperparameter values, such as 120-122, to configure and train target model 110 and then repeat with a slightly different set of hyperparameter values to detect a possible improvement of the performance of the algorithm. By repeated refinement of sets of hyperparameter values and retraining, an optimal configuration set of hyperparameter values may be discovered.

Training target model 110 is computationally very expensive, which may be aggravated by the amount of raw data in a training dataset (not shown), the amount of hyperparameters such as 151-152, or the amount of values in the range of values of a hyperparameter such as 151.

1.6 Exploration

Some of hyperparameters 151-152 may be continuous variables, meaning that even a tiny subrange of such a hyperparameter may contain an infinite amount of points. Due to such intractable combinatorics, computer 100 should not use many or most of the points in the hyperspace for configuring target model 110.

Computer 100 may efficiently explore and narrow the hyperspace to find which configuration alternatives of target model 110 would yield the best training results. During operation, exploring the hyperspace entails intelligently refining existing sets of hyperparameter values to generate new sets of values.

1.7 Narrowing

Narrowing the hyperspace entails using new sets of hyperparameter values to configure target model 110, train the configured target model 110, and record performance metric(s) of the training, such as how much accuracy the trained target model 110 achieves or how much time elapsed during training. Narrowing entails reducing a range of possible values for each hyperparameters 151-152. Narrowing techniques are discussed later herein.

1.8 Epoch

Most possible sets of hyperparameter values are never generated, and those sets that are generated are not all generated at a same time. For example, sets such as 121-122 are generated and tested during epoch 142, while other sets (not shown) are generated during other epochs such as 141.

Epochs are phases of exploration that may or may not occur in parallel. Each hyperparameter has its own more or less independent set of epochs that may span different durations and whose execution may possibly overlap. For example hyperparameter 152 may have progressed through many epochs, while hyperparameter 151 is still in its first epoch.

1.9 Hyperparameter Set Generation

When a given hyperparameter executes its own set of epochs, all of the sets of hyperparameter values that are generated during an epoch have identical values for all of the hyperparameters, except for the values for the given hyperparameter. For example as shown for epoch 142, the given hyperparameter is 152, which is the only hyperparameter that is explored during epoch 142. Heuristics for selecting values for hyperparameters are discussed later herein.

1.10 Cost

Each generated set of hyperparameter values is tested by using it to configure target model 110, training the configured target model 110, and measuring the performance of target model 110 during or after training to score (i.e. cost) the values set. For example, sets of hyperparameter values 120 and 122 have respective costs 131-132.

Depending on the embodiment, costs 131-132 may be a fitness score such as a classification score, an F1 score, a score based on a loss metric, or a function of some or all of these. A classification score measures target model 110's accuracy at recognizing pattern(s), such as facial recognition.

An F1 score measures accuracy of binary recognition, such as whether or not an email is spam. A loss metric measures inaccuracy, such that a lower score is better. In an embodiment, costs 131-132 instead measure time spent training, such that a low score is better because that indicates faster training.

1.11 Task

Calculating costs for each set of hyperparameter values 120-122 is expensive (i.e. slow), especially because training is slow. According to Amdahl's law, horizontal scaling may achieve speedup, such that costing each set of hyperparameter values 120-122 is a unit of work that may be executed asynchronously (e.g. concurrently). Each unit of work may execute in a respective costing task, such as 161-162. Costing tasks 161-162 may each have its own execution thread, processing core, or CPU. In an embodiment, multiple sets of hyperparameter values of a same epoch of a same hyperparameter concurrently execute. In an embodiment, multiple epochs of different hyperparameters concurrently execute.

Each set of hyperparameter values, when processed by a costing task, achieves a cost that is measured and recorded. For example, hyperparameter values 122 is processed by costing task 162 to calculate cost 132, which entails configuring target model 110 with hyperparameter values 122, training the configured model with a training dataset, testing the trained model for accuracy, and calculating cost 132 based on training duration and/or tested accuracy. In an embodiment, cost 132 is based on at least one of: time or memory spent training the ML model, time or memory spent testing the ML model, and/or accuracy indicated by the testing. Minimizing consumptive costs such as time or memory directly improve the performance of computer 100 itself. If computer 100 supports multiprocessing or is part of a computer cluster that does, then minimizing consumptive costs also improve the performance of the multiprocessing system itself.

Computer 100 may maintain best cost 131 that measures the performance of best performing values 120 so far for multiple training sessions of target model 110. If best cost 131 exceeds cost 132, then a new (i.e. lower) best cost is achieved, and set of hyperparameter values 122 and cost 132 replace best values 120 and cost 131 as the best configuration so far for target model 110. Thus, as computer 100 explores the hyperparameter space, a series of monotonically improving sets of hyperparameter values may be discovered.

Because costing tasks that explore different hyperparameters or costing tasks of a same epoch and hyperparameter may concurrently execute, best values 120 may be asynchronously (e.g. concurrently) accessed. Thus, best values 120 and cost 131 are shared state that should be protected from incoherency (e.g. race conditions), such as discussed later herein.

Due to combinatorics of hyperparameters and values, computer 100 may have a backlog of pending sets of hyperparameter values that await costing (i.e. training). For example, the backlog may have more pending sets of hyperparameter values than are available costing tasks 161-162. Techniques for generating and prioritizing backlog based on epochs are discussed later herein.

2.0 Example Exploration Process

Figure 2:
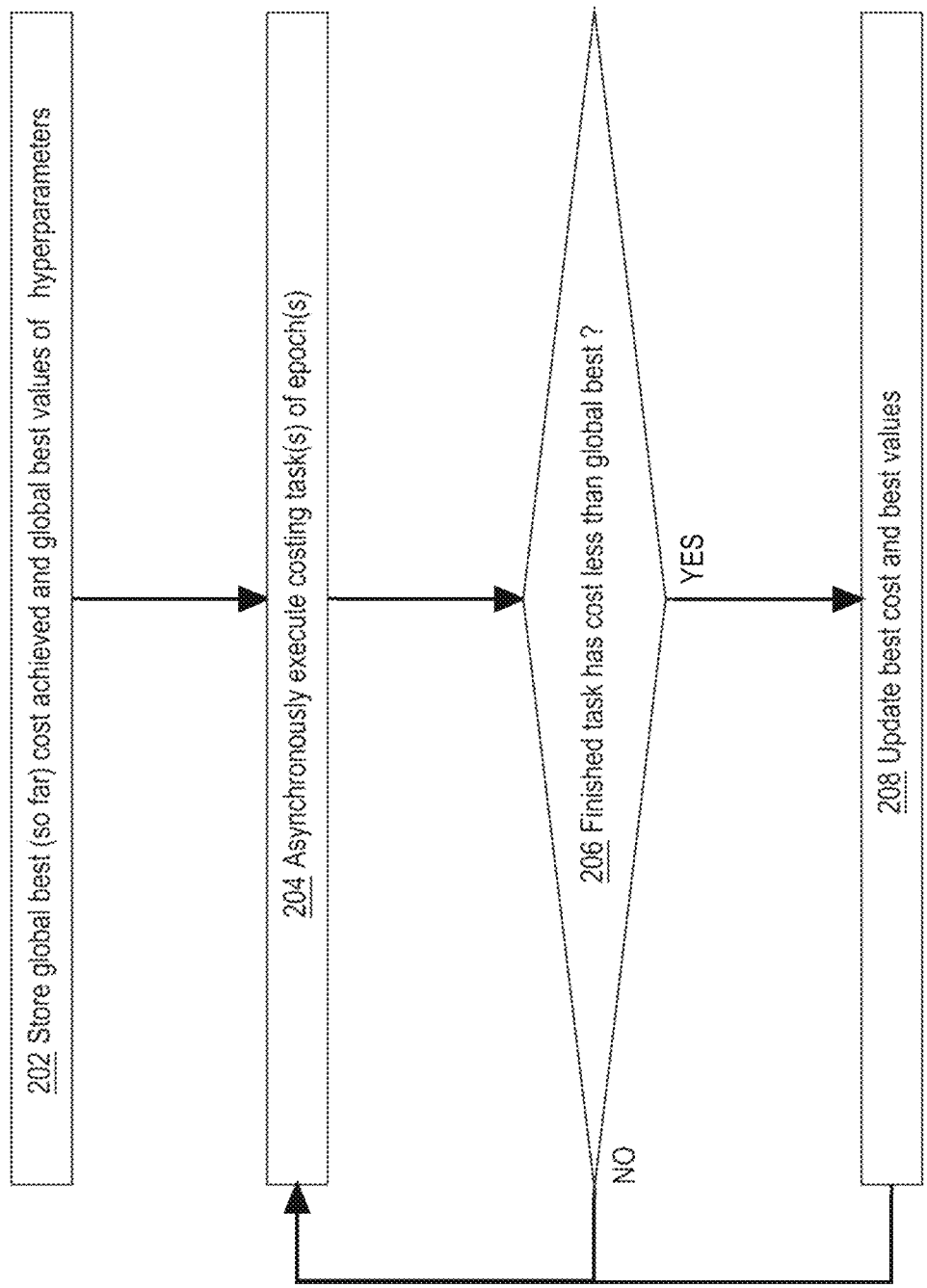
FIG. 2 is a flow diagram that depicts an example computer process for using parallel asynchrony for exploring and costing a hyperparameter space of a ML model.

FIG. 2 is a flow diagram that depicts computer 100 using parallel asynchrony for exploring and costing a hyperparameter space of a machine learning (ML) model, in an embodiment. FIG. 2 is discussed with reference to FIG. 1.

Step 202 maintains shared state. Step 202 stores an ongoing (i.e. still improving) global best cost achieved and global best values of hyperparameters while epochs execute to explore. For example, computer 100 may maintain, in memory, best values 120 and best cost 131 that are shared or replicated for epochs 141-142.

In step 204, the system performs horizontally scaled exploration. During step 204, various epochs may execute and create more epochs as described later herein. Some or all of costing tasks 161-162 of some or all epochs may concurrently execute during step 204. Configuration, training, and testing of target model 110 may repeatedly and concurrently occur during step 204.

Occasionally, a costing task may asynchronously finish, which may cause various scheduling and other operations to occur as described later herein. Upon completion of a costing task, step 206 is performed. Step 206 detects whether or not a cost calculated by the finished costing task is less (i.e. better) than the best cost. For example, costing task 162 may finish, having discovered cost 132 for hyperparameter values 122. Step 206 detects whether or not cost 132 is better than best cost 131. If best cost 131 remains the best, then processing returns to step 204 for continued exploration. Otherwise, processing proceeds to step 208.

Step 208 updates the best cost and best values. For example because cost 132 is better than previous best cost 131, hyperparameter values 122 replace best values 120, and cost 132 replaces best cost 131. Processing then returns to step 204 for continued exploration.

Although not shown, occasionally a last costing task of an epoch finishes, in which case, the epoch finishes. Eventually, a last epoch finishes, in which case, all exploration has finished, and processing may halt with confidence that best values 120 are more or less optimal hyperparameter values for subsequently configuring target model 110 for production training and deployment. Optimal values accelerate eventual production training and increase the accuracy of target model 110. Training and/or actual use of trained target model 110 may occur on a computer other than 100 and/or with a bigger training dataset. Epoch lifecycle and proliferation occur as follows.

3.0 Example Epoch

Figure 3:
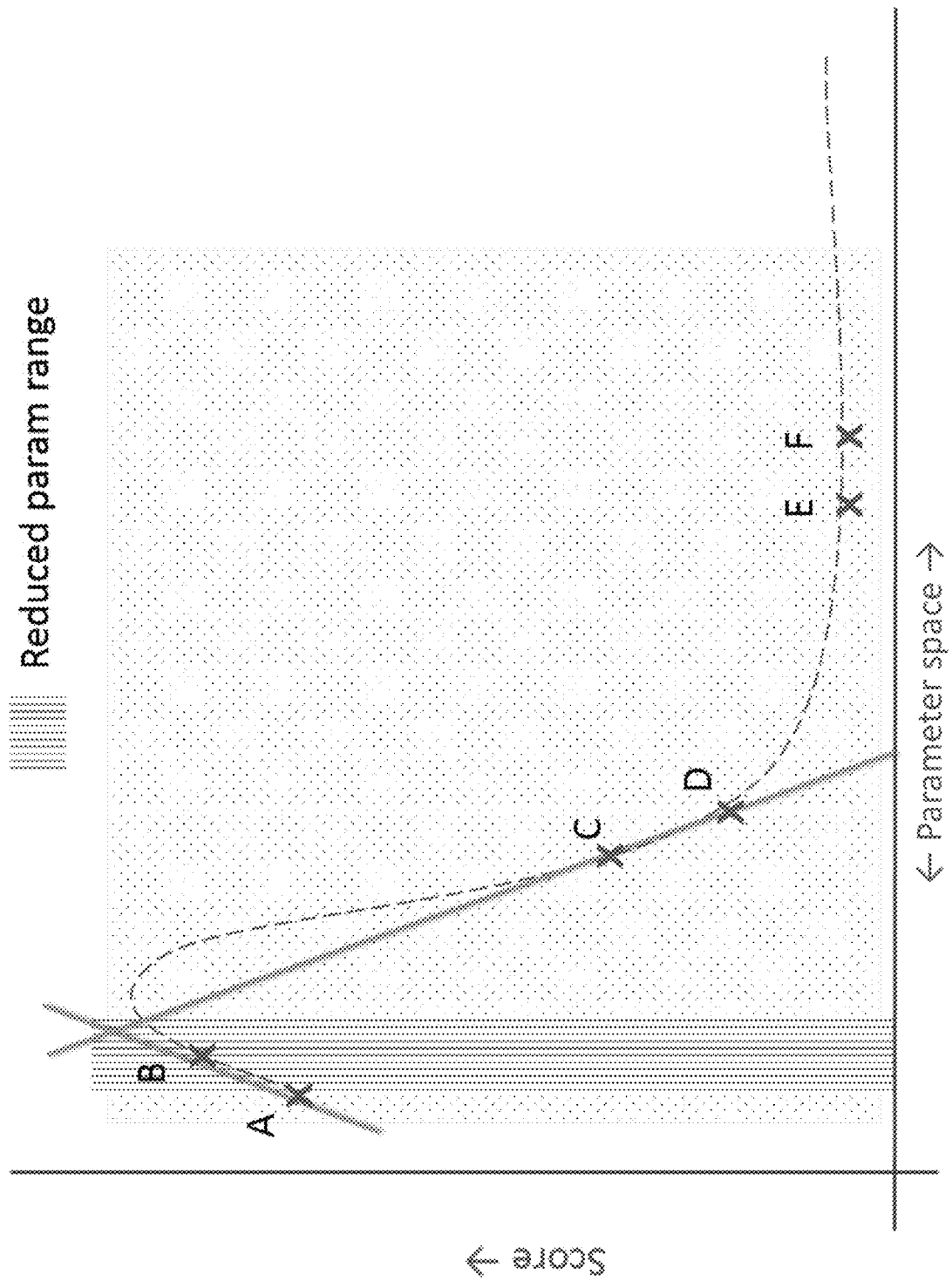
FIG. 3 is a graph that depicts an example epoch and a cost curve that the epoch explores.

FIG. 3 is a graph that depicts an example epoch, in an embodiment. The graph shows sampling of a cost curve of a hyperparameter.

The epoch samples a value subrange of the hyperparameter. As shown, the subrange is the width of the graph. Current samples A-F occur as three evenly spaced pairs. For example, samples A-B are a pair.

Each sample is executed by a costing task that uniquely configure, train, and test a same machine learning algorithm. The costing tasks are asynchronous, have variable durations, and may or may not start at a same time. Thus, costing tasks of a same epoch may finish at different times. The epoch waits until four of its costing tasks finish, which means that four samples have been scored (i.e. costed). For example, samples A-D may be a first four samples to finish. These four samples are sorted by score. In the graph, a higher score is shown as better. In another embodiment, a lower score (i.e. cost) is better. By score, the best two samples form a pair and the second best two samples form another pair. Thus, A and B are the best pair, and C and D are the second best pair. Straight lines, each having a gradient, extend through each of these two pairs. When the gradients differ, the two straight lines may intersect as shown at a point that may be used as a predicted best point.

The intersection point depends on which four samples are used. If instead samples C-F were the first four to finish, then the intersection point would be elsewhere. An epoch may sample more than two pairs. Three pairs are shown, and even more may be efficient. After the first four samples finish, upon finishing each additional sample, a computer detects whether or not the additional sample has a score within the best four scores. If so, then the updated best four points are sorted into best and second best pairs, and an improved intersection point is calculated. That intersection point may be used (e.g. as a midpoint) of a narrower subrange (shown hatched) for a next iteration of the same epoch. Thus, a series of iterations may narrow in on a best value for the hyperparameter for that epoch. Sampling, iterating, and narrowing techniques are presented in related U.S. application Ser. No. 15/885,515.

Each epoch's subrange is narrower than the previous epoch. At the end of the epoch, all samples have been costed. A series of epochs may continue until the subrange is achieves a minimum width, which is convergence and ends the series of epochs. Epoch series occur as follows.

4.0 Epoch Proliferation

Figure 4:
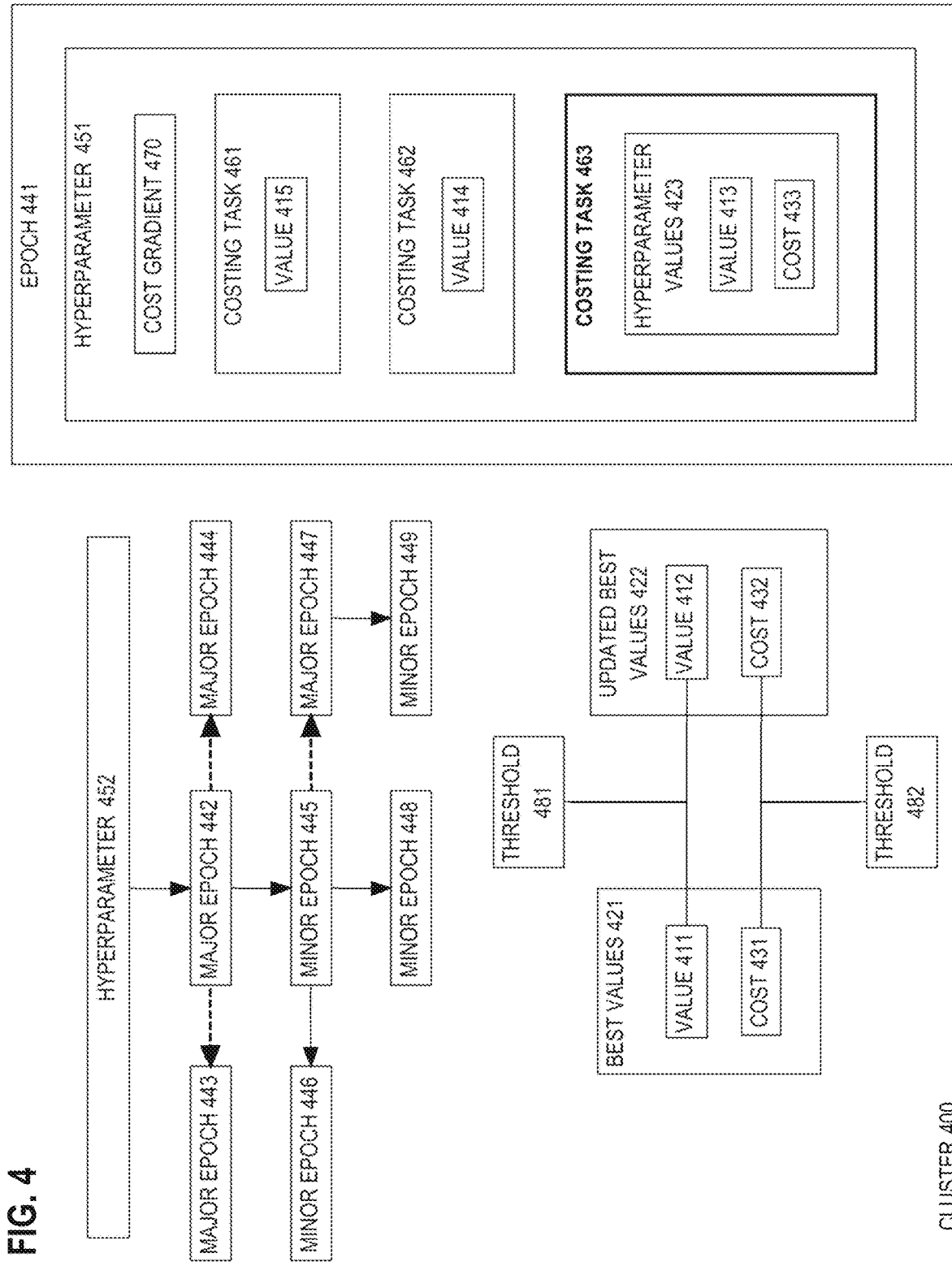
FIG. 4 is a block diagram that depicts an example computer cluster that distinguishes between major and minor epochs to prioritize exploration and cancel unpromising work.

FIG. 4 is a block diagram that depicts an example computer cluster 400, in an embodiment. Cluster 400 distinguishes between major and minor epochs to prioritize exploration and cancel unpromising work. Cluster 400 contains one or more networked computers (not shown), each of which may be an implementation of computer 100. Initially, there is only one epoch per hyperparameter, which are major epochs. Epochs proliferate as follows.

All epochs, including 441-449, may potentially execute concurrently. So long as cluster 400 is not saturated with costing tasks, no epoch need ever wait for any other epoch to finish. Capacity saturation may necessitate a backlog queue for admission control of pending costing tasks that await dispatch for execution. Any executing epoch may improve best values 421 at any time. Epoch 441 may be major or minor, with the difference not mattering while 441 executes, as explained later herein.

Exploration of each hyperparameter starts with one major epoch. For example, exploration of hyperparameter 452 starts with major epoch 442. Any major or minor epoch may create zero or more major and/or minor epochs while executing. For example, major epoch 442 creates major epochs 443-444 and minor epoch 445 while executing.

Each major epoch starts a growing tree of zero or more major and/or minor epochs. Three dashed arrows show three new trees started for major epochs 443-444 and 447. Solid arrows show epochs creating more epochs in a same tree. For example, one tree has epochs 447 and 449, and another tree has epochs 442, 445-446, and 448. In an embodiment, execution of a tree may be managed (e.g. canceled) as a whole. For example, canceling major epoch 447 may optionally cancel the tree of 447 that includes minor epoch 449. Scheduling operations, such as cancelation and prioritization, are discussed later herein.

Epochs that concurrently execute may execute for different durations and may finish in various relative orderings. For example although minor epoch 445 necessarily begins executing before epochs 446-449 begin, epochs 445-449 may potentially finish in any relative ordering. For example, one epoch may take longer to converge than another epoch, as discussed above.

For each sample in an epoch, there is a costing task that scores the sample. Because costing tasks, such as 461-463, are asynchronous and their numerosity may exceed available processing threads, cores, or CPUs, a queue may have a backlog of pending costing tasks that await execution.

Best values 421 and best cost 431 are for a global best of all epochs for all hyperparameters. At any time while executing, epoch 444 may discover a new global best, such as updated best values 422 that replaces best values 421 because cost 432 is less than cost 431. When epoch 444 converges (i.e. finishes), epoch 444 (or a central controller on behalf of epoch 444) may detect whether or not best values 421 has been updated (i.e. replaced with better values) either: a) since epoch 444 began, or b) since best values 421 was replaced with updated best values 422 by epoch 444. If best values 421 was replaced with updated best values by a different epoch, such as 443, after epoch 444 began, then exploration of hyperparameter 454 may continue with a new epoch, such as 441.

5.0 Example Epoch Process

Figure 5:
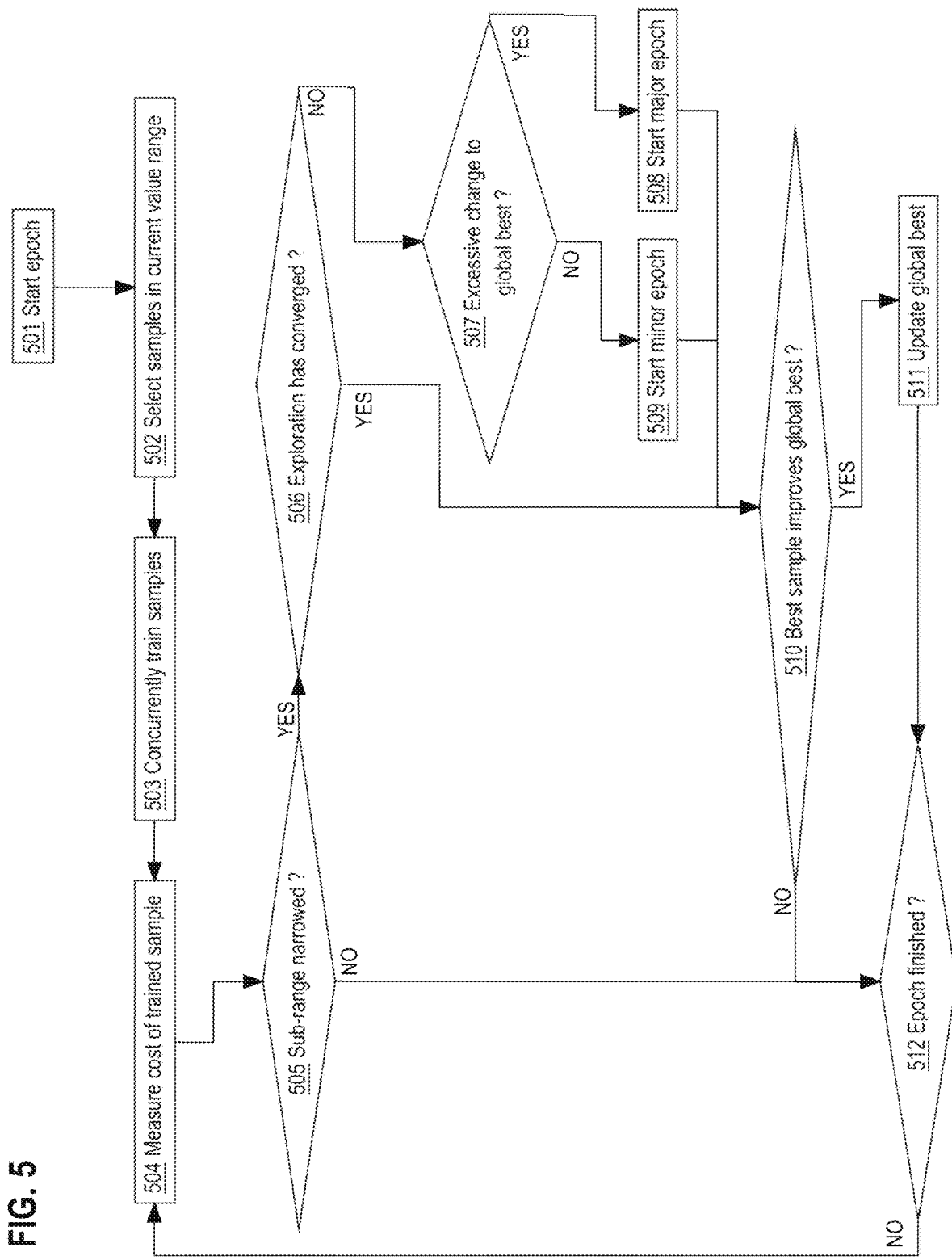
FIG. 5 is a flow diagram that depicts an example computer process for executing a current epoch and creating major and minor epochs.

FIG. 5 is a flow diagram that depicts cluster 400 executing a current epoch and creating major and minor epochs, in an embodiment. FIG. 5 is discussed with reference to FIG. 4.

Step 501 starts a current epoch, which may be a major or minor epoch. Distinctions between major and minor epochs are discussed below for steps 508-509. During step 501 the epoch latches (i.e. retrieves and retains a copy) of the global best achieved so far in any epoch of any series of epochs of any hyperparameter. For example when epoch 444 begins, a copy of global best values 421 and cost 431 are made for epoch 444.

Step 501 also sets the value subrange for the epoch's hyperparameter, which may be a subrange that was narrowed by an older epoch that created the current epoch. If this epoch is major, then the subrange is reset to the hyperparameter's entire natural range. For example, epoch 444 is for hyperparameter 454 that may have a natural range of 3 to 5 (e.g. neural network layers).

Step 502 selects samples within the value subrange of the hyperparameter of the epoch. For example, an evenly spaced, fixed amount of samples may be selected within the value subrange of hyperparameter 454. For example, value 413 may be one sample for hyperparameter 454. Values of other hyperparameters, such as 453, are held constant during epoch 444. Constant hyperparameter values are taken from best values 421 as copied during step 501. Changes to best values 421 made by concurrent epochs of other hyperparameters after step 501 for epoch 444 may be ignored by epoch 444.

Optimal techniques for sampling and narrowing the value range are presented in related U.S. application Ser. No. 15/885,515. For example, samples may be taken in evenly spaced pairs, and each pair indicates a local gradient as explained therein.

Step 503 concurrently trains and tests the current samples of the epoch. For example, each sample value of hyperparameter 454 may be inserted into a respective set of hyperparameter values. For example, set of hyperparameter values 423 may contain sample value 413 for hyperparameter 454. Each sample's set of hyperparameter values may eventually be assigned to an asynchronous (e.g. concurrent) costing task for configuring, training, and testing a same ML algorithm. Sets of values for an iteration may be appended onto a backlog queue and eventually dispatched to costing tasks for (e.g. concurrent) execution. For example, costing task 463 configures, trains, and tests based on hyperparameter values 423.

Different sets of hyperparameter values take different durations to train and test. Thus, costing tasks of a same iteration may finish at different times. Cluster 400 does not wait for all asynchronous costing tasks of the current iteration to finish in step 503. As each costing task, such as 463, independently finishes due to asynchrony, step 504 occurs.

Step 504 occurs each time another sample finishes training and is ready for accuracy testing and costing. Step 504 records a cost of training with the set of hyperparameter values of one sample. As explained above, cost may be based on training duration and/or testing accuracy. In an embodiment, a global history of all processed sets of hyperparameter values and their costs is maintained that step 504 may contribute to. In an embodiment, global history is an associative table (e.g. hash map), and a set of hyperparameter values may be a lookup key to retrieve a known cost or detect that a cost is unknown. In an embodiment, the associative table may be used to avoid redundant training sessions.

As explained above for FIG. 3, a sample that is costed in step 504 may update a best four samples of the epoch, which may move an intersection point of the best two pairs of samples, which may narrow the subrange for a next epoch. Step 505 detects whether or not the costed sample of step 504 caused the subrange to narrow. If the costed sample does not change the best four samples, or the intersection point is not improved (i.e. better predicted cost), or the subrange is not narrowed (e.g. intersection point falls outside of subrange), then processing proceeds to step 512. Otherwise, processing proceeds to step 506.

Step 506 detects whether or not the epoch has converged. Convergence occurs if: a) the subrange narrows to a minimum width, b) the narrowing amount is minimal, or c) the epoch expires (e.g. time to live, TTL). If the epoch converged, then processing proceeds to step 510. Otherwise, processing proceeds to step 507.

Step 507 detects whether or not the global best has changed in a way that is excessive, recent, and unrelated, which are defined as follows. The global update should have been made by a different epoch, after the current epoch began, and after all global updates so far by the current epoch. Embodiments may have one or both of thresholds 481-482 to detect excessive change. New best cost 432 is necessarily less than old best cost 431 (by some difference amount). If that difference amount exceeds threshold 482, then an excessive change has occurred. Likewise, values 411-412 of the explored hyperparameter of the current epoch differ by some amount that may exceed threshold 482. If an excessive change is not detected, then processing proceeds to step 509. Otherwise, processing proceeds to step 508.

Step 508 creates a major epoch, which asynchronously (e.g. concurrently) executes. For example, major epoch 442 may create major epoch 443. Step 508 is followed by step 510.

Step 509 creates a minor epoch, which asynchronously (e.g. concurrently) executes. For example, major epoch 442 may create minor epoch 445. Step 509 is followed by step 510.

Step 510 detects whether or not the still-executing epoch has already improved upon the global best cost. For example, costing task 463 may finish with calculating cost 433 that is better (i.e. less) than best cost 432. Cost 433 is a new best cost, even though epoch 441 has not finished (e.g. or even started) costing tasks 461-462. If the global best is not improved, then processing proceeds to step 512. Otherwise, processing proceeds to step 511.

Step 511 updates the global best. For example, hyperparameter values 423 replace best values 421, and cost 433 replaces best cost 431. Processing then proceeds to step 512.

Step 512 is an implied step that is shown for demonstration and need not be actually implemented with logic. Step 512 represents a possibility that the current epoch is ending. If all of the epoch's costing tasks have finished, or if step 506 indicated convergence, then the epoch is finished. Otherwise, processing returns to step 504 for completion of next costing task of the remaining costing tasks of the epoch.

Creation of epochs at steps 508-509, may create a processing demand spike. In an embodiment, demand spikes are absorbed by a backlog queue (not shown). Iterations of many epochs may be interleaved in the queue. Backlog may be dispatched by asynchronous (e.g. concurrent) distribution to computers of cluster 400 and/or cores or coprocessors of a CPU to exploit horizontal scaling to achieve system acceleration. The duration of an epoch may depend on training efficiency of hyperparameter samples and constants. Thus, an long-running old epoch may compete for processing resources with newer and more promising epochs. Priority inversion may occur, such that promising epochs wastefully wait for unpromising epochs to finish. An implementation may throttle an old epoch in various ways as follows.

In an embodiment, the backlog queue is a priority queue that is sorted by epoch tree age, such that trees that have the latest major epochs have priority. In an embodiment, old epochs are canceled. In an embodiment, pending costing tasks in a backlog queue can be canceled. In an embodiment, already executing costing tasks can be canceled. In an embodiment, only a fixed amount of epochs or epoch trees are sustained, and older epochs or trees of epochs are canceled. In an embodiment, an epoch or tree has a time to live (TTL) before being canceled. In an embodiment, the TTL is set when the epoch or tree begins. In an embodiment, the TTL is reset when the epoch or tree achieves a new global best.

6.0 Cost-Based Search Space Exploration

As explained above, the combinatorics of hyperparameters implies a hyperspace to be explored, which is computationally intractable. Only with intelligent sampling and other heuristics can the hyperspace be efficiently narrowed. A vast majority of points in the hyperspace cannot be explored. Thus, there is a design tension between optimality and feasibility, such that discovery of perfect (i.e. best possible) combination of hyperparameter values is not expected. Either or both of sampling within an epoch and prioritizing between epochs may benefit from heuristics based on metrics such as a predicted cost, such as predicted training duration and/or predicted testing accuracy. With cost prediction, promising exploration may preempt or exclude unpromising exploration.

Training time of models varies significantly based on shape and size of a dataset and also based on type of model. For example, RandomForest models are significantly faster to train than other ML models like SVM or deep learning models like multi-layer perceptrons (MLP). Such a heterogeneity in training time also exists within a single model when varying the hyperparameters of that model. Hence the choices of hyperparameters when auto-tuning the model for each dataset may introduce stragglers (i.e. training sessions, a.k.a. costing tasks) that hurt scaling. To mitigate that, a computer may learn a cost model (i.e. landscape) for each hyperparameter and interpolate gaps in the landscape to predict costs. Cost prediction may be used to balance choices of hyperparameter values based on expected cost. The following are two techniques to facilitate cost-based exploration.

1. Automatically learning the cost function from past explorations. A non-linear model may be made to fit all past evaluations (i.e. costs) to derive a cost function for each hyperparameter. The cost function can be formally defined as: $C(hp_1, hp_2, \ldots hp_N)$. At a minimum, at least two such evaluations are needed per epoch. A computer may repeatedly model this cost function as and when new model evaluations finish. With this cost model for each hyperparameter, the cost of any new evaluation may be predicted and used when picking K points in a given hyperparameter dimension for an iteration of an epoch.

2. Limiting stragglers by selecting more cheap points than expensive ones. Given the cost function, $C(hp_1, hp_2, \ldots hp_N)$, the goal is to pick K points within a current value range $[hp_i^{min}, hp_i^{max}]$ for a particular hyperparameter that balances the workload and avoids stragglers. That entails first estimating the cost of the mid-point of the range: $C_{mid} = C(hp_i, \ldots)$ where $hp_i = hp_i^{mid} = [(hp_i^{max} - hp_i^{min})/2]$, $hp_j$=global_best_hpset$_j$, $\forall j \neq i$, $j \in I\{1, N\}$. $C_{mid}$ is used to limit the number of points selected on each half of the range. That is, P and Q points, $hp_i^k$ are picked from subranges [$hp_i^{min}$, $hp_i^{mid}$) and [$hp_i^{mid}$, $hp_i^{max}$], respectively such that the following conditions are satisfied:

$$P + Q \le K$$

$$\sum_1^K C(hp_i^k, \ldots) \le 2 * C_{mid}$$

The above two conditions ensure that the total cost (i.e. time in this case) in running the K points is on average $C_{mid}$, which is the cost of evaluating the mid-point of the given range. Assuming P represents more desirable points, and Q represents less desirable points, then an implementation may be biased as P>Q, such that more of the more promising points are explored than the less promising points, as a prudential tactic. However, Q should be non-empty to prevent exploration from being too greedy (to avoid getting trapped in a local optimum that was discovered early).

As explained above, each hyperparameter initially has its own predefined range. Initially the cost of any points in that range is unknown. Also as explained above, initial exploration of ranges of unknown cost occurs by (concurrently) costing combinations of extreme/edge values of ranges of hyperparameters. Thus, initial costing of extreme combinations yields initial upper and lower cost bounds for an entire multidimensional solution space. Thus, costs can be quickly established for edge values, which achieves a naïve linear cost model. Whereas, the undiscovered cost landscape is actually rugged (non-linear).

Exploration occurs by selecting and costing the P and Q points. That costing may be used for the following two activities.

a. Refine the cost model with better (non-linear) curve fitting because more points (than merely the edges) are costed; and
  b. Identify edge regions that are wasteful. For example, a hyperparameter may have a predefined initial range of 2-6 (e.g. neural network layers). Subsequent costing may reveal that two layers fails too many tests (high cost) and more than four layers are slow (high cost). Thus during operation, the initial range of 2-6 may be incrementally narrowed to 3-4. Thus in subsequent epochs, P and Q contain increasingly narrow values. Some implementations may use the convergence of a range's bounds as one termination criterion.

6.1 Scalable Task Scheduling

Above, changes to the hyperparameter tuning algorithm itself that are essential for scaling across a distributed cluster 400 of computers were described. Here is a discussion of changes to a task scheduler that determines which computer on which a task is executed (cost-based task scheduling) and when to free up resources by terminating stale tasks.

Asynchronous search may use multicore and/or distributed programming, such as with computer cluster 400 or a data center with server computers. A central dispatcher remotely coordinates all of the work by dispatching costing tasks (units of work) to computers and collecting results, such as per scatter/gather strategy. Each task calculates the cost of a unique set of hyperparameter values. Each task invokes the target model (e.g. logistic regression or neural network) based on hyperparameters. For example if the target model is an artificial neural network, then each task:

1. creates and trains its own neural network based on its own hyperparameters and one or more shared training samples; and
  2. evaluates how successful was the training based on one or more shared testing samples.

The calculated cost is a number based on performance criteria such as time or memory spent training, time or memory spent testing, and fitness/accuracy on tests.

Tasks can be implemented with lightweight threads or heavyweight operating system processes. The distributed architecture does not use horizontal/lateral communication between tasks. Instead, each task operates more or less in isolation without communication except to/from the central dispatcher. So long as the central dispatcher and its communication are lean, then: a) the central dispatcher is not a system throughput bottleneck (i.e. does not offend Amdahl's law with too much serial work), and b) the distributed processing can be horizontally scaled more or less arbitrarily and without logical limit, although available hardware (e.g. computer cluster size) may limit upscaling.

The central dispatcher may track which tasks are running on which computers, which major/minor epoch contains which tasks, and what are the best hyperparameters and cost for each major/minor epoch. The central dispatcher may record all dispatched hyperparameters and their costs to achieve a monotonically growing map of the multidimensional solution landscape.

The worker computers do the costing (e.g. neural training and testing, which are the slowest chores and are compute bound), and the central dispatcher does more or less everything else, such as: hyperparameter value proposals, range narrowing, epoch creation and detection of convergence, load balancing, straggler cancellation, history recording, recognizing and tracking the global optimum, etc. The central dispatcher may itself be multi-threaded. For example, each epoch may have its own control thread in the central dispatcher.

Each epoch is dedicated to exploring one hyperparameter. The central dispatcher may have a concurrent thread for each epoch. Thus, epochs may be managed concurrently. Because the central dispatcher does not wait for all of the point costings of a same epoch to finish (e.g. as few as two costs may be enough to decide to spawn another epoch), the central dispatcher may spawn a next epoch while a previous epoch is still executing for a same hyperparameter. Thus, concurrent epochs may represent different hyperparameters or different range bounds/edges of a same hyperparameter. Thus, different hyperparameters may proliferate epochs at different rates.

The central dispatcher distributes just enough work to saturate each computer. For example, the central dispatcher can use its monotonically improving cost model to estimate how long each dispatched task might need. For example, one long task may be dispatched to one computer, and two short tasks may be dispatched to another computer. The worker computers do not need their own work backlog queues. Indeed, the entire system needs little or no queueing, thereby obviating any need to resort to exotic load-balancing tricks such as work stealing. However, a cluster framework such as Apache Spark may facilitate dispatch timing (e.g. admission control).

6.2 Cost-Based Task Scheduling

In addition to cost-based search space exploration described previously, the detailed cost estimates are also used to schedule the training tasks across a distributed cluster such that effective utilization of compute resources occurs without introducing any unnecessary stragglers. Note that the hyperparameter values even within single hyperparameter dimension may vary in training time. In addition to intra-dimensional training time variation, multiple dimensions can simultaneously dispatch tasks of varying costs. If all the time-consuming tasks are scheduled on the same computer (as might happen with a cost-unaware scheduling algorithm), it may delay all these tasks further as there are only limited resources on each computer. Given availability of reasonable cost estimates, all training tasks may be holistically (e.g. centrally) scheduled across the cluster to further improve scalability by load-balancing tasks. That may be achieved by keeping track of pending tasks assigned to each computer and their costs and equalizing this cost across all computers when scheduling new tasks.

6.3 Terminating Stale Tasks

Although the asynchronous auto-tuning algorithm limits the size of each epoch, it may have many epochs running simultaneously within a hyperparameter dimension. This may result in a large queue of pending tasks (although they would be load balanced) resulting in longer runtimes because of finite compute resources. In order to cap the number of outstanding training tasks, all tasks in an epoch that is 2 (or more) major epochs away from the most recent major epoch are terminated (i.e. canceled). For more recent epochs, cost estimates and number of pending samples in each epoch are used to decide when to terminate or let the tasks run that are very close to completion. This provides a control knob that helps adjust the trade-off between aggressive terminations versus not wasting already used compute by waiting for results. The logical unit of bulk cancellation is an individual epoch or a tree of epochs that are rooted at a major epoch. Whereas, implementations may have a native unit of bulk cancelation, such as a POSIX thread group or a Spark job group. Thus tasks may be natively grouped according to epoch and/or tree and then cancelled as a group to cancel a straggling (too slow) or obsolete (costs not improving) epoch or tree. The central dispatcher decides when and which tasks to cancel. To cancel task(s), the central dispatcher may send (to a worker computer or a Spark scheduler such as Yarn) a cancel request that bears a task identifier, a group identifier, an epoch identifier, a cost threshold, or an age threshold.

7.0 Example Implementation

An example embodiment may be based on the following native Spark implementation. Costing tasks can use Spark's machine learning library (MLlib) to implement a target model, such as logistic regression. Each costing task is implemented as a Python script that is distributed as a Spark ResultTask that relays its calculated cost back to a central dispatcher. The central dispatcher is implemented as a pyspark. SparkContext that uses Python's official multiprocessing package for multithreaded tracking of costing tasks and epochs, such as for integrating asynchronous results from costing tasks. An epoch may be dispatched as a Spark Job. This particular embodiment has the following benefits:
  No compilation/build phase needed;
  No need for Hadoop or Hadoop distributed filesystem (HDFS);
  Flexible distribution (e.g. replicated, cross-mounted, or sent with task script) of shared files such as training/testing samples;
  No inter-task peer communication needed; and
  One codebase for heterogeneous computer cluster (e.g. wide area network, WAN).

8.0 Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

8.1 Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

8.2 Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W of N[L−1] columns and N[L−1] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

8.3 Backpropagation

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
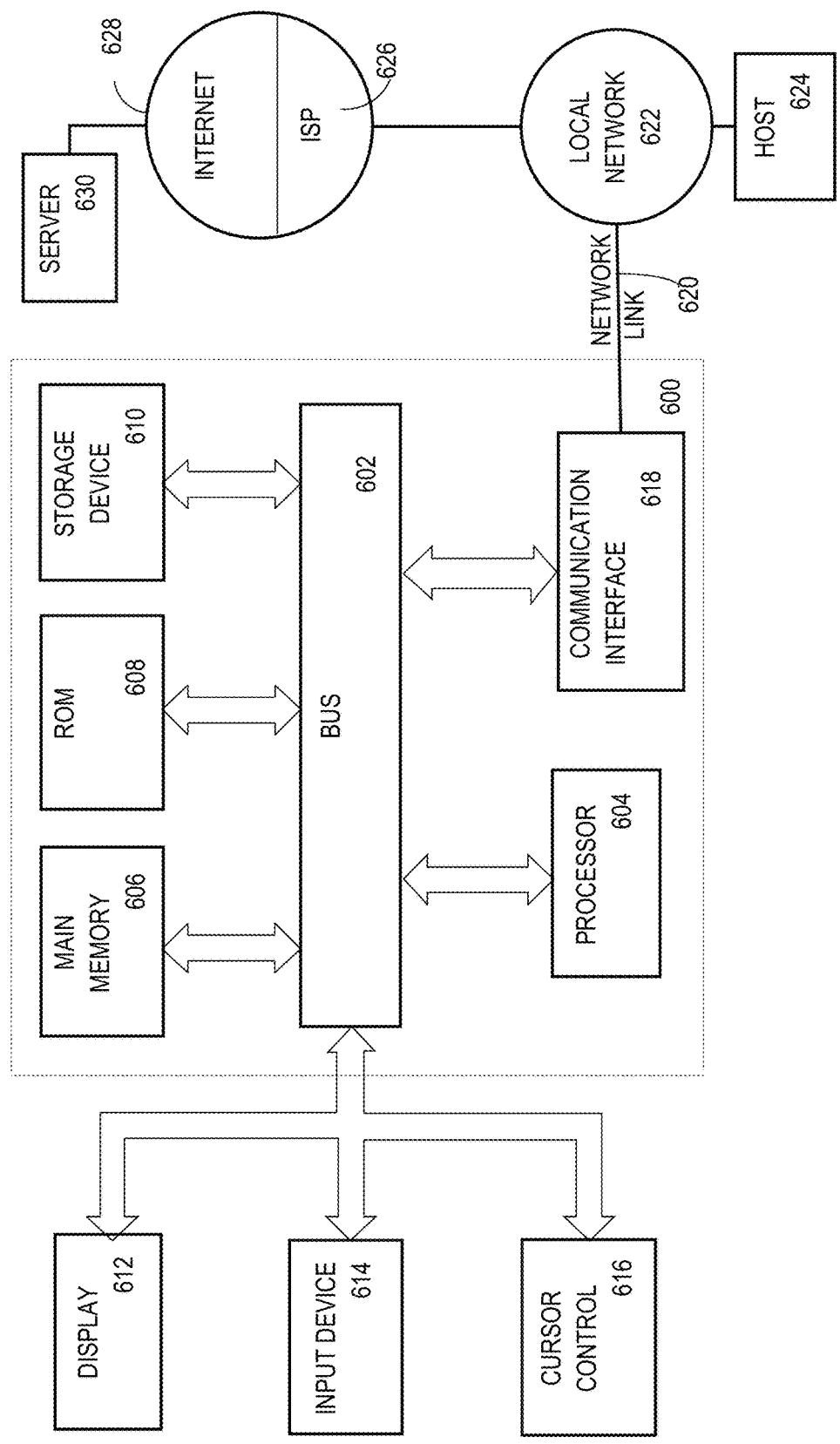
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10.0 Software Overview

Figure 7:
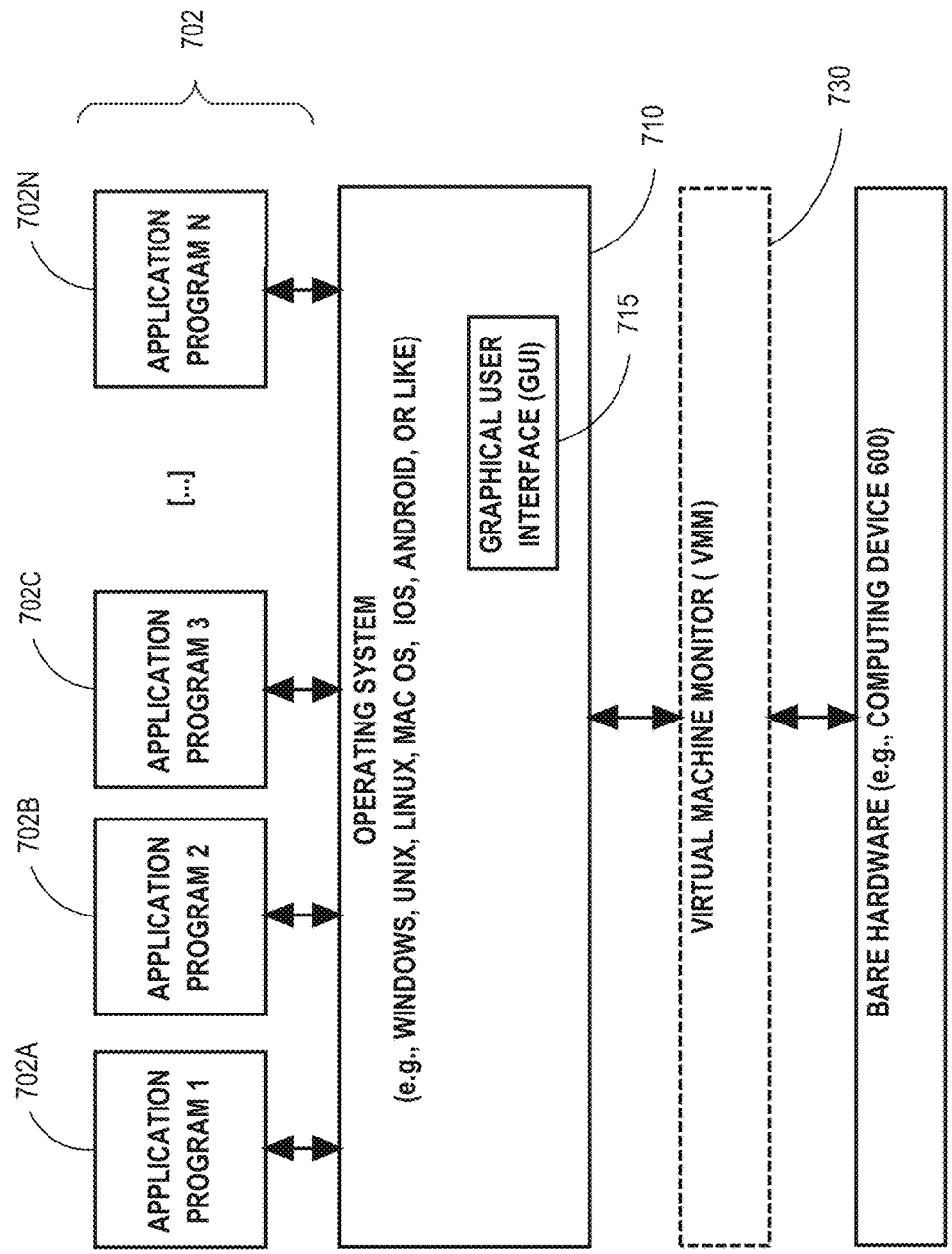
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 607 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 607) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 700 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

11.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing: a) a best cost achieved by executing a target machine learning (ML) model based on a best plurality of values respectively associated with a plurality of hyperparameters, and b) said best plurality of values;
   asynchronously executing a plurality of epochs, wherein:
      each epoch of the plurality of epochs is associated with a distinct hyperparameter of the plurality of hyperparameters;
      each epoch of the plurality of epochs comprises a plurality of asynchronous costing tasks;
      each costing task of the plurality of asynchronous costing tasks comprises an exploratory plurality of values respectively associated with the plurality of hyperparameters and based on said best plurality of values; and
      the plurality of asynchronous costing tasks of said each epoch have different values for said distinct hyperparameter;
   updating the best cost and the best plurality of values when said each costing task measures an actual cost for said exploratory plurality of values that is less than the best cost;
   asynchronously executing a second plurality of epochs based on an updated best plurality of values;
   wherein the method is performed by one or more computers.

2. The method of claim 1 wherein asynchronously executing said plurality of epochs comprises concurrently executing said plurality of epochs.

3. The method of claim 1 further comprising canceling an epoch of the plurality of epochs that is selected based on at least one selected from the group consisting of: an age of the epoch, and an actual cost measured by a costing task of the plurality of asynchronous costing tasks of the epoch.

4. The method of claim 1 wherein said updating the best plurality of values causes asynchronously executing the second plurality of epochs based on the updated best plurality of values so long as at least one condition is satisfied of:
   an updated best cost is less than said best cost by at least a first threshold; and
   a second threshold is exceeded by a difference between:
      a) a value of a particular hyperparameter of the updated best plurality of values and b) a value of said particular hyperparameter of the best plurality of values.

5. The method of claim 1 wherein at least one epoch of said plurality of epochs and at least one epoch of said second plurality of epochs concurrently execute.

6. The method of claim 1 wherein said each costing task measures said actual cost comprises said each costing task trains a machine learning (ML) algorithm.

7. The method of claim 6 wherein said actual cost is based on at least one selected from the group consisting of: time or memory spent training said ML algorithm, time or memory spent testing said ML algorithm, and accuracy indicated by said testing.

8. The method of claim 7 further comprising estimating a predicted cost of a pending asynchronous costing task based on a plurality of actual costs that were measured.

9. The method of claim 8 further comprising assigning a respective plurality of asynchronous costing tasks to each computer of a plurality of computers, wherein said respective plurality of asynchronous costing tasks has at least one selected from the group consisting of: a same combined predicted cost and a same average predicted cost.

10. The method of claim 6 wherein said ML algorithm comprises at least one selected from the group consisting of: an artificial neural network, a random forest, and a support vector machine.

11. The method of claim 1 wherein a value for said distinct hyperparameter of said exploratory plurality of values of a task of a next epoch is based on a gradient of actual costs that were measured for tasks of said plurality of asynchronous costing tasks of a previous epoch.

12. One or more non-transitory computer-readable media storing instructions that, when executed by one or more processors, cause:
   storing: a) a best cost achieved by executing a target machine learning (ML) model based on a best plurality of values respectively associated with a plurality of hyperparameters, and b) said best plurality of values;
   asynchronously executing a plurality of epochs, wherein:
      each epoch of the plurality of epochs is associated with a distinct hyperparameter of the plurality of hyperparameters;

each epoch of the plurality of epochs comprises a plurality of asynchronous costing tasks;

each costing task of the plurality of asynchronous costing tasks comprises an exploratory plurality of values respectively associated with the plurality of hyperparameters and based on said best plurality of values; and the exploratory plurality of values and the best plurality of values have different values for said distinct hyperparameter;

updating the best cost and the best plurality of values when said each costing task measures an actual cost for said exploratory plurality of values that is less than the best cost;

asynchronously executing a second plurality of epochs based on an updated best plurality of values.

13. The one or more non-transitory computer-readable media of claim 12 further comprising canceling an epoch of the plurality of epochs that is selected based on at least one of: an age of the epoch, or an actual cost measured by a costing task of the plurality of asynchronous costing tasks of the epoch.

14. The one or more non-transitory computer-readable media of claim 12 wherein:

updating the best plurality of values comprises asynchronously executing the second plurality of epochs based on the updated best plurality of values so long as at least one condition is satisfied of:

an updated best cost is less than said best cost by at least a first threshold; and a second threshold is exceeded by a difference between: a) a value of a particular hyperparameter of the updated best plurality of values and b) a value of said particular hyperparameter of the best plurality of values.

15. The one or more non-transitory computer-readable media of claim 12 wherein said each costing task measures said actual cost comprises said each costing task trains a machine learning (ML) algorithm.

16. The one or more non-transitory computer-readable media of claim 15 wherein said actual cost is based on at least one selected from the group consisting of: time or memory spent training said ML algorithm, time or memory spent testing said ML algorithm, and accuracy indicated by said testing.

17. The one or more non-transitory computer-readable media of claim 16 further comprising estimating a predicted cost of a pending asynchronous costing task based on a plurality of actual costs that were measured.

18. The one or more non-transitory computer-readable media of claim 17 wherein the instructions further cause assigning a respective plurality of asynchronous costing tasks to each computer of a plurality of computers, wherein said respective plurality of asynchronous costing tasks has at least one selected from the group consisting of: a same combined predicted cost and a same average predicted cost.

19. The one or more non-transitory computer-readable media of claim 15 wherein said ML algorithm comprises at least one selected from the group consisting of: an artificial neural network, a random forest, and a support vector machine.

20. The one or more non-transitory computer-readable media of claim 12 wherein a value for said distinct hyperparameter of said exploratory plurality of values of a task of a next epoch is based on a gradient of actual costs that were measured for tasks of said plurality of asynchronous costing tasks of a previous epoch.

* * * * *

UNITED STATES PATENT AND TRADEMARK OFFICE
CERTIFICATE OF CORRECTION

PATENT NO. : 11,120,368 B2
APPLICATION NO. : 16/137719
DATED : September 14, 2021
INVENTOR(S) : Varadarajan et al.

Page 1 of 2

It is certified that error appears in the above-identified patent and that said Letters Patent is hereby corrected as shown below:

On the Title Page

On page 2, Column 2, under item (56) Other Publications, Line 4, delete "Batlo" and insert -- Batllo --, therefor.

On page 2, Column 2, under item (56) Other Publications, Line 15, delete "Algorithm" and insert -- Algorithm --, therefor.

On page 2, Column 2, under item (56) Other Publications, Line 21, delete "Traning" and insert -- Training --, therefor.

On page 2, Column 2, under item (56) Other Publications, Line 28, delete "Performace"," and insert -- Performance", --, therefor.

On page 2, Column 2, under item (56) Other Publications, Line 62, delete "Sequwnrial" and insert -- Sequential --, therefor.

On page 2, Column 2, under item (56) Other Publications, Line 63, delete "Communicaitons" and insert -- Communications --, therefor.

On page 3, Column 1, under item (56) Other Publications, Line 44, delete "Applicationsm" and insert -- Applications --, therefor.

On page 3, Column 1, under item (56) Other Publications, Line 48, delete "Nural" and insert -- Neural --, therefor.

On page 2, Column 2, under item (56) Other Publications, Line 28, delete "Performace"," and insert -- Performance", --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,120,368 B2

In the Specification

In Column 13, Line 4, delete "$hp_i^{mid})$" and insert -- $hp_i^{mid}]$ --, therefor.

In Column 16, Line 51, delete "programing" and insert -- programming --, therefor.

In Column 18, Line 34, delete "and or" and insert -- and/or --, therefor.